United States Patent
Bibet et al.

(10) Patent No.: US 9,920,885 B2
(45) Date of Patent: Mar. 20, 2018

(54) PUMPING BLOCK DEVICE HAVING AN INTEGRATED BYPASS CIRCUIT

(71) Applicant: TOTAL SA, Courbevoie (FR)

(72) Inventors: Pierre-Jean Bibet, Pau (FR); Jean-Luc Le Rodallec, Pau (FR); Olivier Saincry, Pau (FR)

(73) Assignee: TOTAL SA, Courbevoie (FR)

(*) Notice: Subject to any disclaimer, the term of this patent is extended or adjusted under 35 U.S.C. 154(b) by 0 days.

(21) Appl. No.: 14/907,559

(22) PCT Filed: Jul. 15, 2014

(86) PCT No.: PCT/FR2014/051814
§ 371 (c)(1),
(2) Date: Jan. 25, 2016

(87) PCT Pub. No.: WO2015/011368
PCT Pub. Date: Jan. 29, 2015

(65) Prior Publication Data
US 2016/0290331 A1    Oct. 6, 2016

(30) Foreign Application Priority Data
Jul. 24, 2013  (FR) .................................... 13 57305

(51) Int. Cl.
*F17D 1/14*    (2006.01)
*E21B 43/01*    (2006.01)
(Continued)

(52) U.S. Cl.
CPC .............. *F17D 1/14* (2013.01); *E21B 21/001* (2013.01); *E21B 43/01* (2013.01);
(Continued)

(58) Field of Classification Search
CPC ............. Y10T 137/86171; E21B 43/36; E21B 43/121; E21B 43/01; E21B 43/0107;
(Continued)

(56) References Cited

U.S. PATENT DOCUMENTS 3,642,384 A    2/1972 Huse
3,746,027 A *  7/1973 Elliott ....................... F17D 1/14
                                                            137/1

(Continued)

FOREIGN PATENT DOCUMENTS

CN    202 153 317 U    2/2012
DE    10 2009 015990 A1    7/2010

OTHER PUBLICATIONS

International Search Report for PCT/FR2014/051814, dated Sep. 24, 2014, 3 pgs.

(Continued)

*Primary Examiner* — Atif Chaudry
(74) *Attorney, Agent, or Firm* — Patterson Thuente Pedersen, P.A.

(57) ABSTRACT

This invention relates to a multiphase pumping block device comprising a pump and a bypass circuit. Said bypass circuit is suitable for enabling the flow of a fluid from an area upstream of the pump to an area downstream of the pump by bypassing the pump. The latter comprises at least out non-return valve suitable for blocking the flow of the fluid from the area downstream of the pump to the area upstream of the pump. In addition, the pumping block device is connected to a set of pumping circuits, comprising a main bypass circuit suitable for enabling the flow of a fluid from an area upstream of the connected pumping block to an area downstream of the connected pumping block. Finally, the pumping block device is arranged in order to be disconnected from said set of circuits for maintenance.

3 Claims, 2 Drawing Sheets

(51) Int. Cl.

| | |
|---|---|
| *E21B 21/00* | (2006.01) |
| *E21B 43/36* | (2006.01) |
| *F04D 31/00* | (2006.01) |
| *F04B 49/24* | (2006.01) |
| *F17D 1/00* | (2006.01) |
| *F04C 13/00* | (2006.01) |
| *F04C 14/26* | (2006.01) |
| *F04D 3/02* | (2006.01) |
| *F04D 7/00* | (2006.01) |
| *E21B 43/12* | (2006.01) |
| *F04B 47/06* | (2006.01) |
| *F16K 15/00* | (2006.01) |
| *F04C 2/16* | (2006.01) |

(52) U.S. Cl.
CPC ........ *E21B 43/0107* (2013.01); *E21B 43/121* (2013.01); *E21B 43/36* (2013.01); *F04B 47/06* (2013.01); *F04B 49/24* (2013.01); *F04C 13/008* (2013.01); *F04C 14/26* (2013.01); *F04D 3/02* (2013.01); *F04D 7/00* (2013.01); *F04D 31/00* (2013.01); *F16K 15/00* (2013.01); *F17D 1/005* (2013.01); *F04C 2/16* (2013.01); *F04C 2210/24* (2013.01); *F04C 2230/80* (2013.01); *Y10T 137/86171* (2015.04)

(58) Field of Classification Search
CPC . F04D 31/00; F17D 1/14; F17D 1/005; F04B 49/24

See application file for complete search history.

(56) References Cited

U.S. PATENT DOCUMENTS

| | | | | |
|---|---|---|---|---|
| 4,799,864 | A * | 1/1989 | Hockley | A01G 25/162 137/207.5 |
| 2003/0188873 | A1* | 10/2003 | Anderson | E21B 43/017 166/357 |
| 2004/0182451 | A1* | 9/2004 | Poirier | E03B 7/04 137/563 |
| 2010/0119382 | A1* | 5/2010 | Scarsdale | F04B 35/04 417/53 |

OTHER PUBLICATIONS

English translation of International Search Report for PCT/FR2014/051814, dated Sep. 24, 2014, 2 pgs.

* cited by examiner

US 9,920,885 B2

PUMPING BLOCK DEVICE HAVING AN INTEGRATED BYPASS CIRCUIT

RELATED APPLICATIONS

The present application is a National Phase entry of PCT Application No. PCT/FR2014/051814, filed Jul. 15, 2014, which claims priority from FR Patent Application No. 1357305, filed Jul. 24, 2013, said applications being hereby incorporated by reference herein in their entirety.

FIELD OF THE INVENTION

This invention relates to the field of multiphase pumping, in particular in the field of pumping fluids in the framework of underwater oil drilling wells.

BACKGROUND OF THE INVENTION

For architectures of conventional underwater pumping stations, it was for a long time customary to use pumps that are not very powerful (<1 MW) and that have a relatively low pressure differential (i.e. low ΔP, <50 bar).

With the advances in technical progress, more powerful pumps must be used (about 2.5 MW), for example in so called recent "Offshore deep-sea drilling" projects such as the Pazflor project and the GirRI project. These pumps can be suitable for generating a pressure differential ΔP of about 130 bar.

These new pumps can in particular be:
pumps referred to as "MPP" (for "multiphase pump") with a substantial increase (or "High Boost");
hybrid pumps.

Although the power of these pumps was increased, the pumping devices that accompany these pumps have not changed (i.e. pumping stations outside the pumps).

However, such devices are not free of defects.

Indeed, although these pumping devices satisfied the characteristics of low-power pumps, the operating constraints of high-power pumps impose improving these devices.

This invention improves the situation.

This invention proposes a multiphase pumping block device comprising:
a pump suitable for pumping a pumping fluid;
a bypass circuit suitable for enabling the flow of a fluid from an area upstream of the pump to an area downstream of the pump by bypassing the pump, with the bypass circuit comprising at least one non-return valve suitable for blocking the flow of the fluid from the area downstream of the pump to the area upstream of the pump.

The pumping block device is suitable for being connected to a set of pumping circuits, with said set of circuits comprising a main bypass circuit suitable for enabling the flow of a fluid from an area upstream of the connected pumping block to an area downstream of the connected pumping block by bypassing said connected pumping block.

The pumping block device is arranged in order to be disconnected from said set of circuits for maintenance.

The term "area downstream of the pump" refers to an area connected to the outlet of the pump.

The term "area upstream of the pump" refers to an area connected to the inlet of the pump.

The upstream area (respectively the downstream area) of the pump can be advantageously close to the inlet (respectively the outlet) of the pump and are inside the pumping block. Indeed, the bypass circuit makes it possible to create a diversion within the pumping block itself, this pumping block is suitable for being retrieved easily with respect to the rest of the pumping station. This retrieval can make it possible in particular to replace certain defective parts of the pumping block (such as valves, impellers, etc. or any other parts subjected to high constraints or stresses).

The non-return valve located on the bypass circuit can make it possible to limit the recirculation of pumped fluid when the pump is actuated and operational, and when the pressure differential between the inlet and the outlet of the pump is positive.

The set formed by the set of pumping circuits and the pumping block device can be called a "pumping station".

In the case of starting of the pump, this bypass circuit can make it possible to prevent allowing the free flow to flow through the pump and as such prevent any abnormal wear and tear of the latter (ex. mechanical seals).

Using this bypass circuit integrated into the pumping block, the starting of the pump can be carried out without using the main bypass circuit conventionally used for this purpose.

In an embodiment, the pumping block device can further comprise an anti-retour suitable for blocking the flow of a fluid from the area downstream of the pump to the pump.

As such, the non-return valve can protect the pump from any backflow or abnormal flow of fluid and which could result in a degradation of the pump.

In addition, the bypass circuit further comprises a valve suitable for controlling the flow of a fluid in the bypass circuit. This valve can be a valve of the "choke valve" or "on-off valve" type.

In case of stoppage of the pump, it can be useful to open this valve in order to balance the upstream and downstream pressures of the pump. This opening can makes it possible to prevent using the main bypass circuit and as such limiter the wear and tear of its various parts such as its valves.

Other characteristics and advantages of the invention shall further appear when reading the following. The latter is purely for the purposes of information and must be read with regards to the annexed drawings wherein:

DETAILED DESCRIPTION OF THE INVENTION

Figure 1:
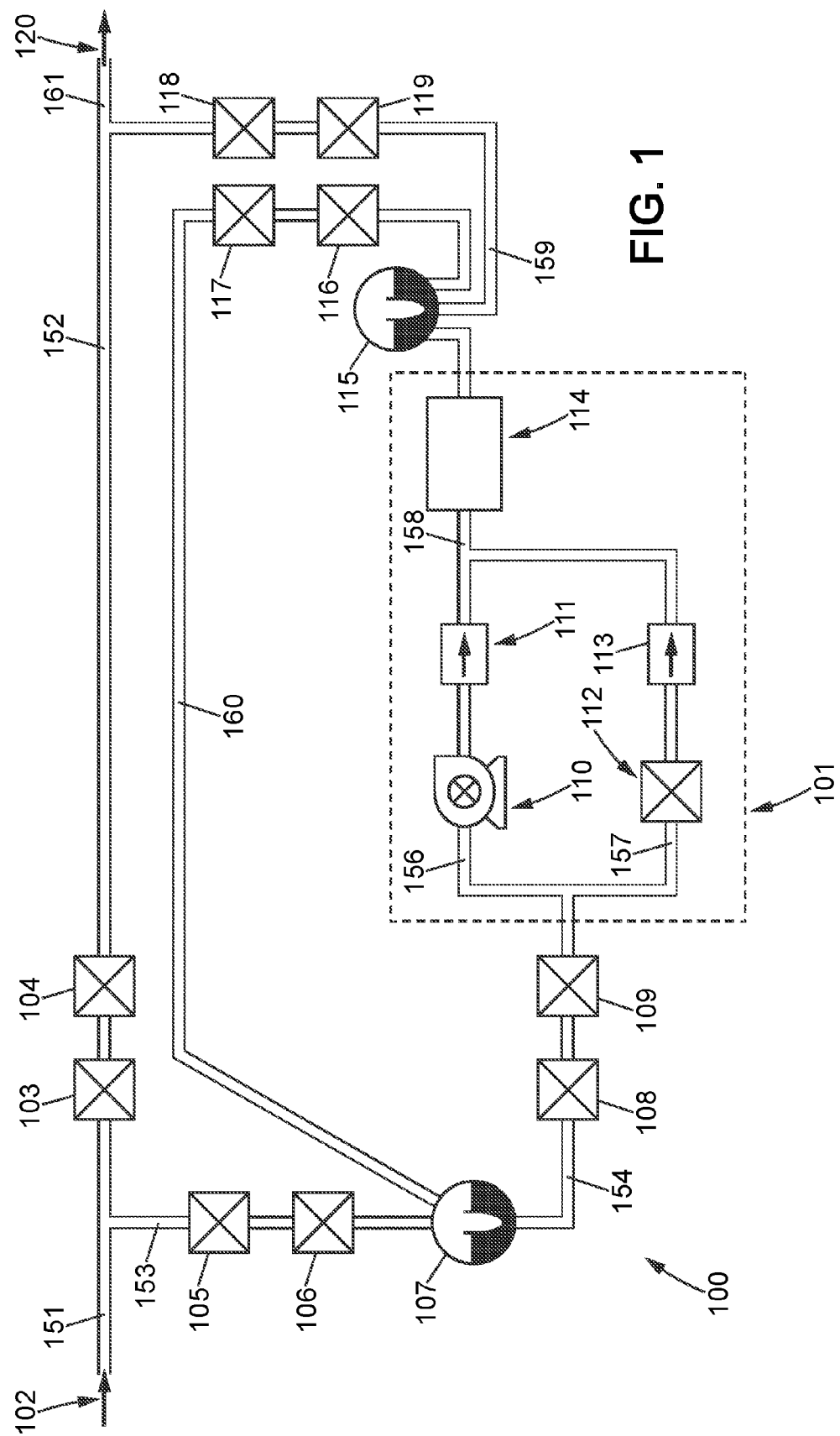
FIG. 1 shows an example of an underwater pumping station in a particular embodiment of the invention.

FIG. 1 shows an example of an underwater pumping station in a particular embodiment of the invention.

This pumping station comprises:
an inlet 102 connected to the production well;
an outlet 120 connected to the production line and which makes it possible to raise the pumped fluid to the surface;
pumping circuits 151 to 161 which make it possible to circulate the pumped fluid;
valves 103 to 106, 108, 109, 112, 116 to 119. These valves can be choke valves, "on-off" valves, or any other type of valves. Some valves can be advantageously valves that open or that close automatically in case of failure of their control system (hydraulic or electric for example) such as for example valves 103 or 104, 116 or 117;

a pump 110;

a mixer tank 107. During the pumping in conditions of a non-constant flow, the pump must handle operating conditions that can vary very abruptly (clog of liquid without gas or clogs of gas). The rapid change in these conditions can cause abrupt variations in the load on the pump, and can cause mechanical problems or failures on the rotor of the latter. A mixer tank makes it possible to mix the liquid and to homogenise it before having it pass through the pump. As such, the mixer tank can make it possible to limit the fluctuation of the torque of the shaft during pumping and therefore the degradations of the pump;

non-return valves 111 and 113;

a multiphase flow meter 114 (or MPFM). A multiphase flow meter is a device used to take measurements on the pumped fluid (mixtures of oil, water and gas produced) during the production process;

a splitter tank 115 makes it possible to separate the liquid, gas and solids in suspension in the liquid (such as sand, etc.). For the purposes of illustration, it is possible to use decanting in order to carry out this separating. As such, due to their respective density, the various phases are separated: the heaviest materials are at the bottom of the tank. According to the tapping height (i.e. height of recovery in the tank), it is possible to recover either the solid matter (i.e. low tapping) or the liquid matter (i.e. tapping at a medium height) or gases (i.e. high tapping). It is also possible to recover a mixture of different phases as the separation of the various phases may not be complete.

The elements 110 to 114 and 156 to 158 constitute a pumping block 101 that can be retrieved from the pumping station. For example, this retrieval makes it possible to raise to the surface the pumping block 101 for the purposes of technical maintenance (e.g. repairs).

Under normal and established operating speeds, the circuit 151 is connected to the pumping well drilled in the seabed. As such, the pumping fluid circulates in the latter.

The valve 103 is closed in order to prevent this fluid from circulating in the main bypass circuit 152. The valve 104 is maintained in open position but it can be actuated on demand in order to overcome the failure of the valve 103.

These two valves 103 and 104 are called the "Main Bypass Valves" or MBPV.

When the pump 110 is operating, the valve 103 is then closed, and is "subjected to" the pressure differential ΔP generated by the pump 110 and/or imposed by the system.

In case of stoppage of the pump 110, it may be necessary to quickly open the valve 103 in order to balance the upstream and downstream pressures of the pumping device 100 shown in FIG. 1. As such, if the valve 103 and the valve 104 are fully open, they make it possible to balance the pressures then to provide free production (production in "Free Flow" mode) through the main bypass circuit 152. The circuit 161 is connected to the production line to the surface (direction 120).

In such a situation of stoppage of the pump, the valve 103 opens under a substantial pressure differential ΔP, and during its opening, multiphase fluids transit through this valve 103: gases, sands, hydrocarbons, etc. This valve is therefore substantially solicited from a mechanical standpoint during the opening phases.

In the event of a failure of a mechanical element of this valve 103, it is not possible to simply raise it to the surface in order to repair it because its positioning in the pumping station 100 does not allow for this (this is said to be a "non-retrievable" valve). Indeed, although the pumping block can be detached relatively simply, the other parts of the pumping station are installed to practically remain permanently and the maintenance of the latter most often requires the use of remotely operated underwater vehicles (or RUVs) or autonomous underwater vehicles (or AUVs).

As such, it can be useful to provide a valve 104 in the hypothesis where the valve 103 were to malfunction (e.g. breakage of a mechanical part breaking the seal on the valve 103). The life expectancy of such a combination (elements 103 and 104) can as such be doubled.

In addition, under normal and established operating speeds, the valves 105, 106, 108, 109, 119, 118 are open enabling as such the pumped fluid to flow into the mixer tank 107. This mixed pumping fluid then passes through the pump 110 thanks to the circuit 156.

This pump 110 can be for example a pump of the twin screw MPP type or a pump of the helicoaxial MPP type.

At the outlet of the pump 110, a non-return valve 111 is positioned on the circuit 156 in order to prevent, in case of stoppage of the pump, the excess pressure at the outlet of the pump 110 from causing a backflow in the pump and damaging it.

In addition, in parallel of the circuit 156, a bypass circuit 157 is used to enable a bypassing of the pump 110 by the operating fluid at the moment of the starting, when the pressure in the line 156 is greater than the pressure in the line 158. In the case of starting of the pump 110, it is indeed useful to prevent allowing the so-called free flow production of the well to flow through the pump 110.

This bypass can be called "integrated bypass" as this bypass is integrated into the pumping block 101 and can be removed with the latter.

The circuit 157 is then provided with a valve 112 and with a non-return valve 113. In the event of a failure of the pump 110, it may be useful to open the valve 112 in order to balance the upstream and downstream pressures of the pumping block 101. This opening can make it possible to avoid opening the valve 103 (case described hereinabove) and as such limit its wear and tear. The wear and tear is then supported by the parts of the valve 112 but the latter can be simpler to repair since it can be retrieved (with the pumping block 101) in order to be repaired on the surface.

It is therefore customary to open the valve 103 controlling the flow in the main bypass 152 in order to allow the free flow to flow, then to gently start the pump: the latter can then operate temporarily with an excessive flow rate due to the low resistance offered by the fluid. The valve 103 is then closed by an operator by controlling the operating parameters of the pump until the complete closing of the valve 103.

This method can be complex and the use of an integrated bypass 157 as shown in FIG. 1 can simplify it.

The starting of the pump 110 can be carried out with the valve 103 closed. On the other hand, the valve 112 is open.

The free flow of the well then passes, in a first step, through the integrated bypass circuit 157. During the starting of the pump in this configuration, the pump 110 will progressively increase the pressure differential between its inlet and its outlet. Then, the non-return valve 113 on the circuit 157 closes naturally. If the valve 113 closes, the pump works in resistance on the production fluid and cannot function with an excessive flow rate.

The starting is then automatic for the operator and the valve 103 is not mechanically solicited for the starting of the pump.

The production fluid is then injected into the multiphase flow meter 114 in order to control the various parameters at the pump outlet.

This production fluid is then injected into a splitter tank 115. A circuit 159 is then tapped in this tank 115 in such a way as to recover the fluid that is of interest for production (i.e. the crude oil in the framework of an oil well).

Likewise, another circuit 160 (i.e. "recycle line") is tapped in this tank 115 in such a way as to recover a liquid (that is not necessarily of interest for production). The circuit 160 enables a reinjecting of liquid into the mixer tank 107. Indeed, this can be useful in order to prevent, in case of the presence of a substantial volume of gas (i.e. clogs of gas) in the production circuits, starting the pump 110 with an excessively low flow rate and deteriorating it. It is therefore useful to circulate in the pump a minimum flow rate in order to protect the pump 110.

To do this, it is possible to open if necessary a valve located on the recycle line 160 in order to control the flow of liquid to an area upstream of the pump 110 (here, to the mixer tank) and to re-use the liquid in order to avoid operating the pump 110 empty or to operate one of its pumping stages under operating speeds that can deteriorate it.

However, these valves are often valves of the actuated hydraulic valve type. These types of valves have opening and closing times of several minutes and do not make it possible to satisfy the constraints of rapidity linked to the appearance of strong gas bubbles in the production lines.

In order to overcome this problem, it is possible to replace the actuated hydraulic valve mentioned previously with a set of valves in series comprised of:
- an actuated hydraulic valve 117 and
- a valve 116 of the "on/off" type of which the opening is controlled by the de-energizing of a spring. As such, the opening is immediate, but it is not possible to choose the ratio of closing of the valve: either it is fully open, or it is fully closed.

Thanks to this set, it is possible to control the valve 117 in order to constantly obtain a pre-opening that corresponds to the minimum flow rate for the protection of the pump.

As such, in the case of the presence of a substantial volume of gas (i.e. bubbles of gas) in the production circuits, the valve 116 can be opened very rapidly and place the valve 117 on line set to its pre-opening. Of course, the pre-opening of the valve 117 can vary over time according to the various operating parameters of the pump such as the power consumed or the speed of the pump.

The pump is then protected in a very short period of time.

Figure 2:
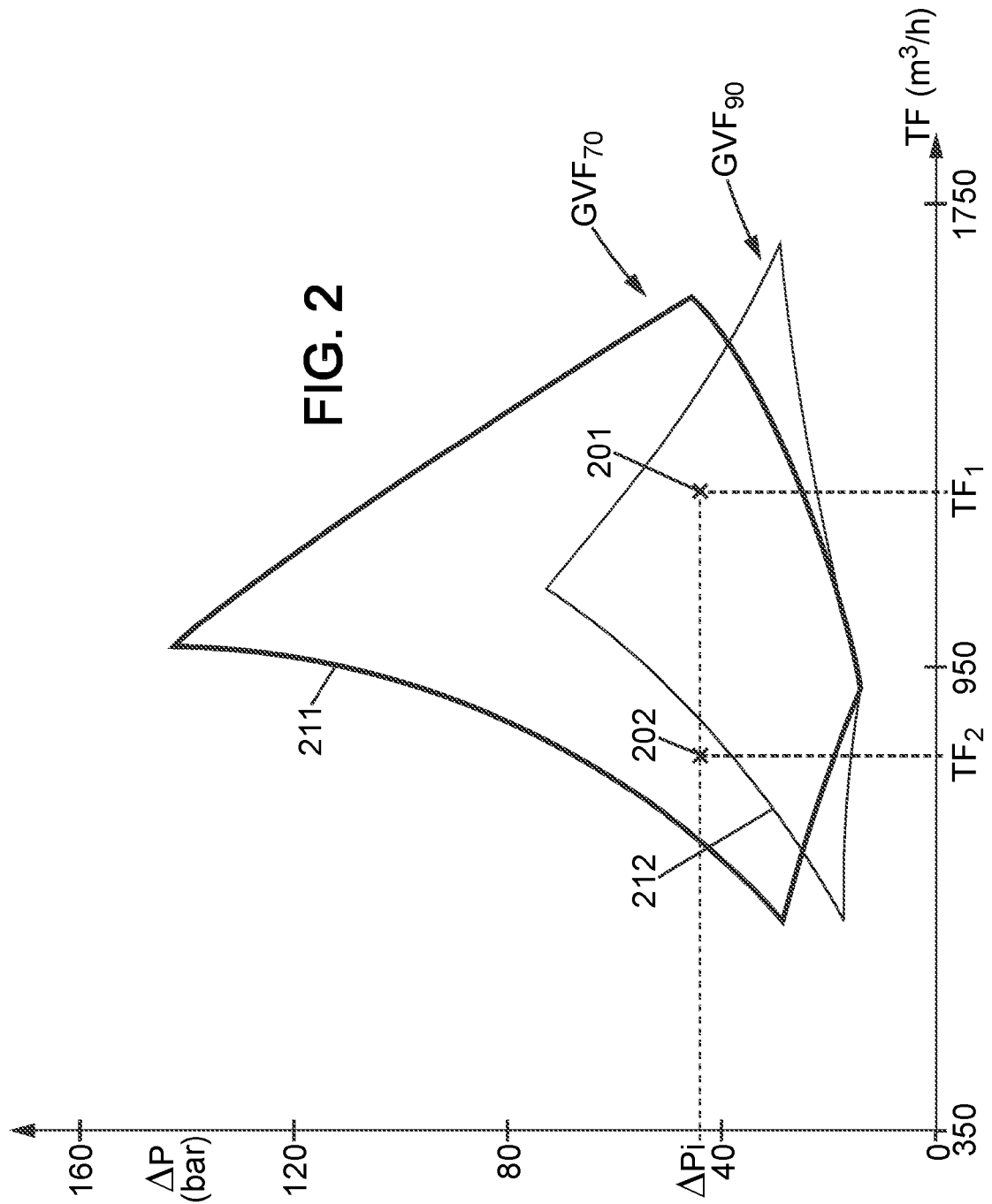
FIG. 2 shows an example of an operating diagram of a multiphase pump in an embodiment of the invention.

FIG. 2 shows an example of operating diagrams of a rotodynamic multiphase pump in an embodiment according to the invention.

The first operating curve $GVF_{70}$ shows the operation of a stage of this pump for a "GVF" of 70%. The GVF (or "Gas Volume Fraction") represents the gas volume fraction with respect to the total volume.

If the pump is operating in an established manner with a "GVF" of 70%, the point of operation of this stage for ideal operation of the pump can correspond to the point 201.

Note that the point of operation of this stage for an ideal operation of the pump does not necessarily correspond to the ideal point of operation for this stage alone. Indeed, as the pump comprises a large number of stages, these two points can be separate in light of the operation of the other stages.

As such, the pumped volume is TF1 m3/h.

The minimum flow rate curve for this pump stage and for a GVF of 70% can be materialised by curve segment 211: a point of operation of this stage located to the left of this segment 211 corresponds to a low speed of the stage, a speed that can deteriorate the latter.

During an abrupt change in the composition of the pumped fluid (e.g. clog of gas), the GVF of the fluid can vary by changing for example to 90%.

The second operating curve $GVF_{90}$ shows the operation of a stage of this pump) for a "GVF" of 90%.

The minimum flow rate curve for this pump stage and for a GVF of 90% can be materialised by the curve segment 212.

Of course, due to this abrupt variation, the point of operation of the stage can be modified: the latter can then be displaced on the left to the point 202 (with the difference in pressure ΔPi being considered as constant for the time scale that is pertinent in protecting the pump).

As such, the point of operation 202 corresponds to a speed at that is low for this stage. It can be useful for this speed to not be maintained during an excessively long period of time.

In reference to FIG. 1, it is possible to open the valves 116 and 117 (as described hereinabove) in order to reinject upstream of the pump a liquid taken downstream of the latter and as such "return" the stage to a non-dangerous operating mode for the stage or the pump (i.e. displace the point 202 to the right).

Of course, this invention is not limited to the embodiments described hereinabove by way of examples; it extends to other alternatives.

Other embodiments are possible.

For example, some valves shown in FIG. 1 may not be present or be grouped together.

In addition, several pumping blocks can be used in parallel in order to increase the pumping power. As such, each pumping block can have its own splitter tank and its own recycle line.In addition, also attached please find a pre-issuance memo regarding a potential term extension in the above-mentioned matter. Our recommendation is to wait for issuance of the patent and determine at that time whether a request for term extension is appropriate.

The invention claimed is:

1. A pumping system comprising
a set of pumping circuits; and
a polyphasic pumping block device, the pumping block device comprising
a pump suitable for pumping a fluid; and
a bypass circuit suitable for enabling the flow of the fluid from an area upstream of the pump to an area downstream of the pump by bypassing the pump, said bypass circuit comprising at least one non-return valve suitable for blocking the flow of the fluid from the area downstream of the pump to the area upstream of the pump;
wherein said pumping block device is connected to the set of pumping circuits,
wherein said set of pumping circuits comprising a main bypass circuit suitable for enabling the flow of the fluid from an area upstream of the pumping block device to an area downstream of the pumping block device by bypassing said pumping block device;
and wherein said pumping block device is arranged in order to be disconnected from said set of pumping circuits for maintenance.

2. The pumping system according to claim 1, wherein the pumping block device further comprises a non-return valve suitable for blocking the flow of the fluid from the area downstream of the pump to the pump.

3. The pumping system according to claim 1, wherein the bypass circuit further comprises a valve suitable for controlling the flow of the fluid in the bypass circuit.

\* \* \* \* \*